Nov. 28, 1967 R. J. NOVOTNY 3,354,651
ABLATIVE ROCKET THRUST CHAMBER
Filed July 16, 1965 2 Sheets-Sheet 2
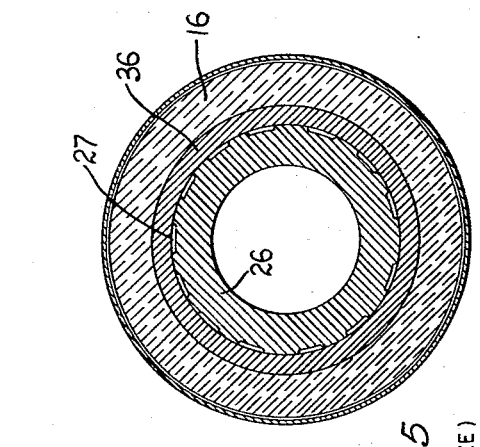
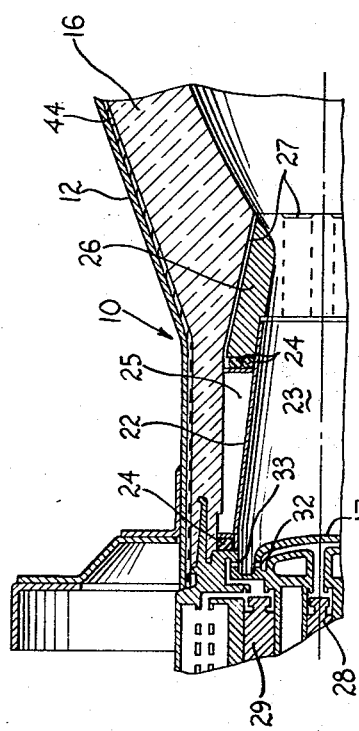
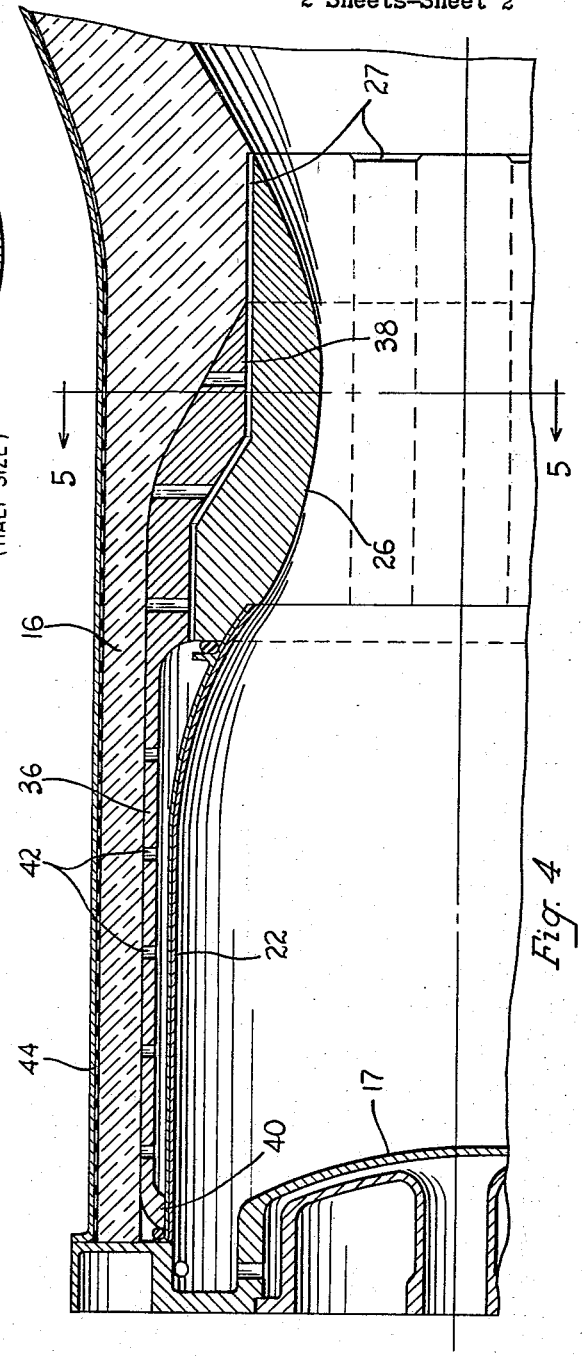
INVENTOR.
RAYMOND J. NOVOTNY
BY
AGENT

United States Patent Office 3,354,651
Patented Nov. 28, 1967

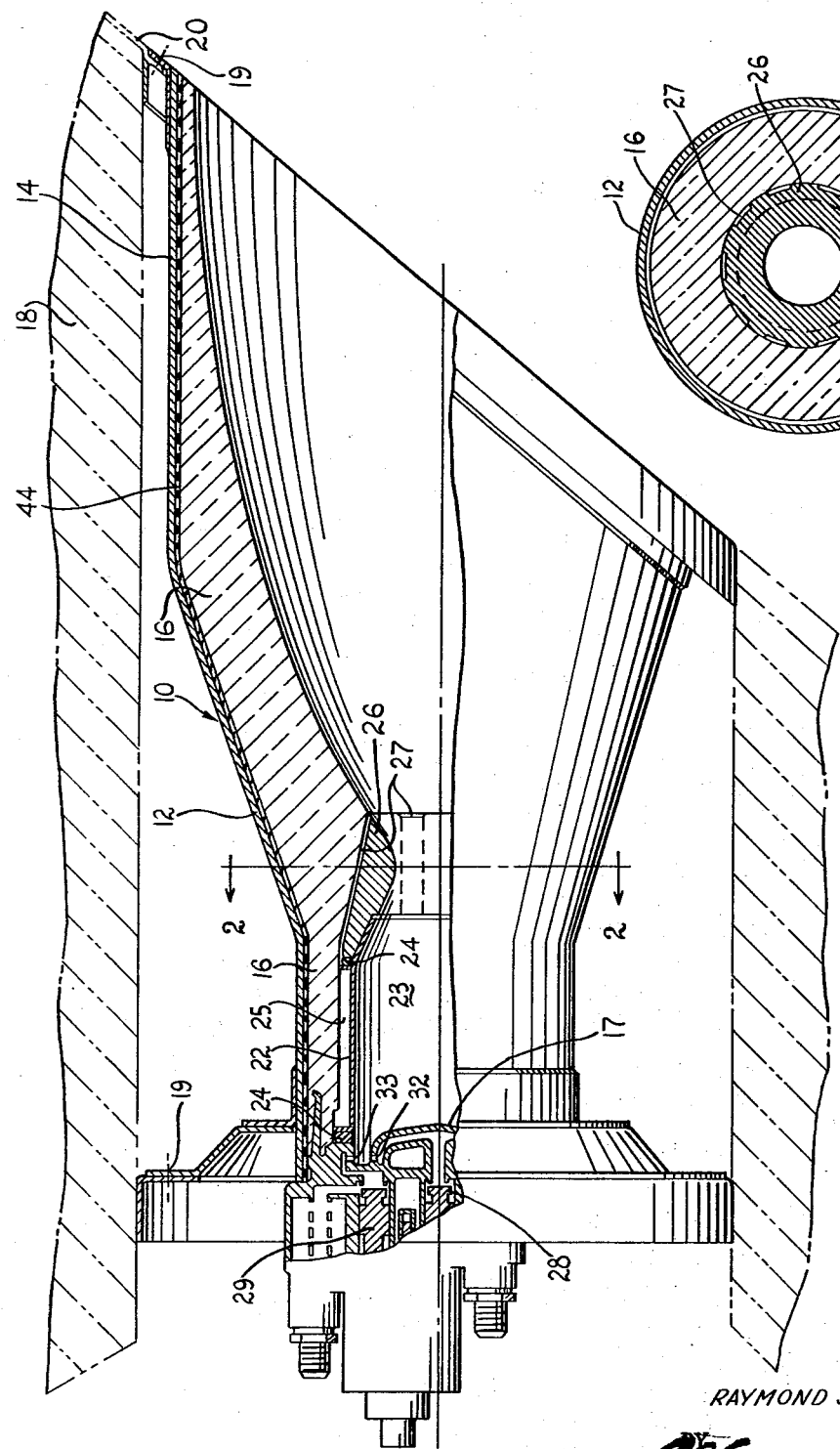

3,354,651
ABLATIVE ROCKET THRUST CHAMBER
Raymond J. Novotny, Mount Fern, N.J., assignor to Thiokol Chemical Corporation, Bristol, Pa., a corporation of Delaware
Filed July 16, 1965, Ser. No. 472,447
8 Claims. (Cl. 60—258)

This invention relates generally to rocket powerplants and more particularly to an improved thrust chamber therefor of the ablative type.

Ablative thrust chamber constructions in rocket powered missiles, space craft, etc. have become very popular due to their basic simplicity. Unfortunately, however, ablative thrust chambers are characterized by a number of serious drawbacks. Among these are: an excessive weight and an excessive gimbaling inertia; a limited steady-state firing durability; and an excessive thermal sensitivity to pulse-mode type duty cycles.

Accordingly, the main object of the present invention is to provide an improved thrust chamber construction of the ablative type which will obviate the above and other drawbacks of known ablative thrust chamber constructions.

An important object of the present invention is to provide an improved ablative thrust chamber so constructed and arranged as to have a very low heat transfer coefficient due to laminar boundary layer propellant flow along a radiation liner, and to aspirated flow of decomposed ablative liner gases.

Another important object of the present invention is to provide an improved ablative thrust chamber construction which materially reduces heat flux values by a novel combination of full-diameter, vortex propellant injection with a radiation liner, and a chamber-vented, cooled throat insert leading to the ablative exhaust chamber or nozzle.

A further important object of the present invention is to provide an improved ablative thrust chamber which also employs the radiation mode of heat transfer.

A still further important object of the present invention is to provide novel means in a thrust chamber for transferring heat from the nozzle throat area to a cooler portion of the inner liner of the chamber.

Another important object of the present invention is to provide an improved rocket thrust chamber of the "vortex" injection type which has a full chamber diameter vortex, a low mass radiation liner with a radiation thermal barrier behind it, and an ablative liner.

Other objects and advantages of the invention will become apparent during the course of the following description.

In the drawings I have shown several embodiments of the invention. In these showings:

FIGURE 1 is a central, longitudinal sectional view of one embodiment of the invention;

FIGURE 2 is a transverse sectional view thereof taken on the line 2—2 of FIGURE 1;

FIGURE 3 is a fragmentary view similar to FIGURE 1 of another embodiment of the invention showing the use of a conical radiation liner rather than a cylindrical one;

FIGURE 4 is a similar view of a further embodiment of the invention showing the use of a novel liner for transferring heat from the nozzle throat area to the cooler front portion of the radiation liner adjacent the injector; and FIGURE 5 is a transverse sectional view thereof taken on the line 5—5 of FIGURE 4.

Referring to FIGURES 1 and 2 of the drawings, numeral 10 designates as a whole the rocket thrust chamber comprising one embodiment of the invention which includes an outer combustion chamber wall 12 preferably of aluminum which terminates aft in an expansion cone or exhaust nozzle 14 and which is provided throughout with an ablative liner 16 formed of a 10° layup or laminae of silica phenolic. A flexible insulative potting material 44 is used between the outer combustion chamber wall 12 and the ablative liner 16 to facilitate the assembly thereof and also bond said chamber wall 12 to said ablative liner 16. The thrust chamber 10 is closed at its left or upstream end by a full diameter vortex injector 17 of the "vortex" type which communicates therewith for the injection of propellants therein, which propellants may be a hypergolic (self-igniting) consisting of an oxidizer and a fuel such as nitrogen tetroxide and monomethylhydrazine respectively.

The thrust chamber 10 is suitably mounted in a missile or space craft 18 by means of fore and aft mounting brackets 19 with its exhaust nozzle 14 or extension thereof terminating flush with the outer skin 20 of the space craft.

A low mass radiation liner 22, defining the combustion chamber 23 is mounted centrally and radially inward of the combustion chamber wall 12 and its ablative liner 16 by means of cushioning silastic O-rings 24 to also define a vacuum radiation thermal barrier or stagnant gas space 25. The radiation liner 22 is cylindrical and preferably formed of a refractory metal such as columbium, tantalum, tungsten or alloys thereof and bears a coating of a thin refractory ceramic such as hafnia, thoria, etc. which coating is also applied to the nozzle throat insert 26 which is used to minimize erosion and is formed of a refractory ceramic such as silicon carbide or a refractory metal such as foamed molybdenum; a hard dense graphite is another possible throat insert material.

The thermal resistance of the nozzle insert 26 is enhanced by boundary layer flow of the propellants therealong as will be explained, and by circumferentially spaced passages or vents 27 formed between the insert and the ablative liner 16 which enable the discharge of relatively cool decomposed resin gases from the ablative liner adjacent the vacuum radiation thermal barrier or stagnant gas space 25 into the nozzle during operation of the thrust chamber 10.

Admission of the pressurized propellants into the combustion chamber is controlled by a pair of close-coupled, high response valves 28 and 29. The oxidizer is admitted into the injector 17 by the valve 28 and is injected radially into the combustion chamber 23 by circumferentially spaced injection ports 32 while the fuel is admitted tangentially into the chamber 23 by correspondingly spaced injection ports 33.

This produces a full chamber diameter vortex flow moving circumferentially toward and through the nozzle throat (insert 26) and along the nozzle and its extension if any. The purpose in using the full diameter vortex is to lay down a uniform and effective boundary layer of cool fuel and fuel-rich combustion products from the vortex annulus at the injector all along the radiation liner 22 with minimum flow disturbance, and also to maintain a uniformly cool, injector-end of the thrust chamber to minimize heat soak back into the propellant valves.

The thrust chamber radiation liner 22 is designed to block heat flow without incurring excessive heat storage. If it were used in a conventional manner, the thrust chamber would suffer from the same difficulties as pure radiation engines. However, when the radiation liner is used in combination with a full diameter vortex injector, the maximum liner temperature near the nozzle insert end, is approximately 2000° F. with the injector end of the radiation liner operating at approximately 500° F.

It is to be noted that the gradual increase in temperature (500–2000° F.) along the length of the radiation liner 22 has three fundamental advantages. Frst, the low average temperature of the liner reduces thermal storage; second, a gradual and uniform heating and burning of the fuel and fuel-rich gases is assured prior to and during their entering of the convergent section of the nozzle; and lastly, a low emissivity surface finish or coating for high reflectivity is readily sustained on the backside of the liner 22.

During operation, the propellants are injected through the full diameter vortex injector 17 and spin aft along the radiation liner 22 in laminar flow to effectively cool it. Experiments show that the laminar boundary layer of the fuel-rich propellants also exists in the nozzle throat plane and is responsible for reducing the heat flux (very low heat transfer coefficient) as well as substantially reducing the gas-side wall temperature.

It is to be noted that the heat storage in the throat insert is reduced by combining the cooling characteristics (laminar boundary in the throat) of the full diameter vortex injector with the convective heat absorption of the decomposed resin gases evolved from the thermal barrier section of the ablative liner 16 located adjacent the radiation barrier 22.

As these relatively cool gases (600–800° F.) are generated, they are vented aft through the cooling passages 27 between the rear surface of the insert 26 and the contiguous surface of the ablative liner 16. As the cool gases emerge from the divergent section of the throat insert 26, they are aspirated into the boundary layer flowing aft over the ablative liner 16 of the divergent section of the nozzle 14.

The diffusion of these cooler decomposed resin gaseous species which contain free hydrogen and hydrocarbon gas mixtures, into the nozzle boundary layer enhances the thermal resistance of the nozzle ablative liner. The net result thereof is either a much lower skin temperature or a thinner (and hence materially lighter) nozzle ablative liner, or combination thereof—whichever is most desirable for an application in question.

The importance insofar as weight alone is concerned of the novel structure disclosed is pointed up by experiments which indicate with respect to the heat transfer characteristics of a 100 lb., 100 Pc. ablative chamber, that 0.30 and 0.12 B.t.u./in.$^2$ sec. are representive fluxes for the chamber and nozzle sections of conventional ablative chambers. The present invention reduces these heat flux values to 0.05 and 0.03 respectively. Thus, only an ablative thickness of approximately 1/6 to 1/2 respectively, of that of *conventional* design thickness appears necessary when using the principles of the present invention.

Since approixmately 80% of a conventional ablative thrust chamber's weight is directly attributable to the ablative lining material, a gross chamber weight reduction enabled by the present invention will be 40 to 65% or approximately one-half of the weight of a conventional ablative chamber. This represents a major improvement over known ablative thrust chambers not only from a weight standpoint but from a durability standpoint as well.

Also, because of the very low heat transfer rates characteristic of the present invention during transient and steady-state operation, it is very insensitive to pulse mode duty cycles. Further, the low heat fluxes and the absence of erosion of the ablative in contact with the stagnant gas space 25 also allow operation for significantly longer firing durations of up to 200% over comparable conventional designs.

The disclosure of FIGURE 3 is identical in all respects (and so similar parts bear identical numbers) to that of FIGURES 1 and 2 with the single and major exception that the radiation liner 22' is conical in shape rather than cylindrical as in liner 22. Material advantages accrue from the direct path of the vortex from the injector to the throat insert. For example, it enables the maintaining of a rate of change of the pressure gradient in the combustion chamber to achieve a laminar boundary layer over a greater chamber length as compared to the use of the cylindrical radiation liner 22.

A further and highly important embodiment of the invention is disclosed in FIGURES 4 and 5 wherein a cylindrical radiation liner is employed although a conical one may be substituted therefor without variation of the principles of the invention herein disclosed. This embodiment of the invention is also identical with that of FIGURES 1 and 2 (so that similar numerals are employed on identical parts) with the material exception of the addition of a cylindrical thermal equalizing or heat "shunt" liner 36.

As is well known, the most critical area (heat-wise) of the thrust chamber is the throat section. As a result, erosion and wear-resistant throat inserts, such as 26 are employed. It is thus desirable to conduct heat away from the nozzle throat area and in a conventional ablative thrust chamber, copper or nickel might be employed as good thermal conductors although such application is not known and their high temperature capability is marginal.

In the present invention, it is desirable that the heat be conducted longitudinally away from the throat area (so as not to place too great a thermal burden on the ablative liner adjacent the throat) to a less critical area and yet not increase the radial heat flux. To this end, the thermal heat equalizing liner 36 is formed of pyrolytic graphite whose peculiar properties enable it to be formed as a laminated cylindrical or conical liner to conduct heat in a longitudinal or "$a$" direction parallel to the interfaces of the laminae, and to also act as a heat insulator in a transverse or radial "$c$" direction.

As shown in the drawings, the pyrolytic graphite cylindrical liner 36 is shaped to conform with and lie against the inner face of the ablative liner 16 from the injector 17 to the aft end of the nozzle throat insert 26. The aft or throat insert end of the pyrolytic liner is scarfed as at 38 so that the ends of the laminae bear against the insert to permit rapid conduction of heat away from the insert. The injector end of the liner 36 is bent radially inward as at 40 to contact the radiation liner 22 and conduct heat into it as a heat sink.

The pyrolytic graphite liner 36 is also perforated about its periphery at spaced points so as to provide ablative gas venting apertures 42 and effect additional cooling. It will thus be seen that the liner 36 acts as a very effective insulator in the radial or "$c$" direction which further minimizes the transfer of heat to the ablative walls. Also, coatings on the outer side of the radiation liner 22 and on the inner side of the graphite liner 36 can be varied to produce different thermal emissivities and hence further optimize the heat transfer rate.

It will be apparent that the combination radiation-ablative rocket thrust chamber of the present invention is significantly more simple in construction, will be more efficient in operation, and will have very low heat transfer to its enclosure or space craft due to the novel and combined use of a low mass radiation liner with a radiation thermal barrier behind it and the ablative liner. These desirable characteristics are enhanced by the full diameter vortex propellant injection, and by the pyrolytic graphite liner.

The invention as shown in the various figures is not limited to the buried configuration as typified by the space craft 18 but may also be hung overboard. In this respect a thin-shelled radiation cooled nozzle expansion cone or exhaust nozzle would be adapted to the basic combustion chamber 23 and mate therewith at the divergent end of the nozzle throat insert 26.

It is to be understood that the forms of the invention herewith shown and described are to be taken as preferred examples of the same and that various changes in the shape, size, and arrangement of parts may be resorted to without departure from the spirit of the invention or the scope of the subjoined claims.

I claim:
1. A rocket thrust chamber characterized by high efficiency and low heat transfer to its airframe enclosure comprising, in combination, a low mass radiation liner defining a combustion chamber terminating in a nozzle including a throat; a layer of ablative material concentric with and spaced from said liner and defining an air thermal radiation barrier therewith; an insert of a material having high heat conductivity surrounding said throat and contacting it and said layer and closing said air barrier; cooling passages extending longitudinally between said insert and said layer and connecting said air barrier with points downstream of said throat to vent the gases generated in said air barrier by the ablating layer; and means for injecting propellant into said chamber to produce a cooling uniform boundary layer with minimum flow disturbance of fuel-rich combustion products along the gas side of said liner.

2. The combination recited in claim 1 wherein said radiation liner is cylindrical.

3. The combination recited in claim 1 wherein said radiation liner is conical.

4. The combination recited in claim 1 wherein a heat conductor is located between said combustion chamber and said ablative layer and extends between and contacts the throat of said nozzle and the forward part of said radiation liner adjacent said injecting means to conduct heat longitudinally away from said throat.

5. The combination recited in claim 4 wherein said conductor is an insulator to heat in a radial direction.

6. The combination recited in claim 5 wherein said conductor is formed of pyrolytic graphite.

7. The combination recited in claim 4, and ablative gas venting apertures formed in said conductor.

8. A rocket thrust chamber characterized by high efficiency and low heat transfer to its airframe enclosure comprising, in combination, a low mass radiation liner defining a combustion chamber terminating in a nozzle including a throat; a layer of ablative material concentric with and spaced from said liner and defining an air thermal radiation barrier therewith; an insert of a material having high heat conductivity surrounding said throat and contacting it and said layer and closing said air barrier; a heat conductor positioned between said combustion chamber and said ablative liner and extending between and contacting the throat insert and the forward part of said radiation liner adjacent said injecting means to conduct heat longitudinally away from said throat; and means for injecting propellant into said chamber to produce a cooling uniform boundary layer with minimum flow disturbance of fuel-rich combustion products along the gas side of said liner.

References Cited

UNITED STATES PATENTS

| 3,073,111 | 1/1963 | Hasbrouck | 239—265.15 |
| 3,129,560 | 4/1964 | Prosen | 239—265.15 |
| 3,169,368 | 2/1965 | Munding | 60—258 |
| 3,182,469 | 5/1965 | Kirchner | 239—265.15 |
| 3,222,862 | 12/1965 | Sadownick | 239—265.11 |
| 3,251,554 | 5/1966 | Krauss | 239—265.15 |

CARLTON R. CROYLE, *Primary Examiner.*

D. HART, *Assistant Examiner.*